(12) United States Patent
Miyake et al.

(10) Patent No.: US 8,207,996 B2
(45) Date of Patent: Jun. 26, 2012

(54) LIGHT SOURCE DEVICE, OPTICAL SCANNING DEVICE, AND IMAGE FORMING APPARATUS

(75) Inventors: Shinsuke Miyake, Kanagawa (JP); Atsufumi Omori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 467 days.

(21) Appl. No.: 12/434,798

(22) Filed: May 4, 2009

(65) Prior Publication Data

US 2009/0303451 A1 Dec. 10, 2009

(30) Foreign Application Priority Data

Jun. 10, 2008 (JP) ................................ 2008-151148

(51) Int. Cl.
*B41J 15/14* (2006.01)
*B41J 27/00* (2006.01)

(52) U.S. Cl. ........................ 347/242; 347/257

(58) Field of Classification Search .......... 347/236–238, 347/245–247, 257, 263
See application file for complete search history.

(56) References Cited

U.S. PATENT DOCUMENTS

| | | | | |
|---|---|---|---|---|
| 4,907,034 A | * | 3/1990 | Doi et al. ................. | 355/400 |
| 5,587,813 A | * | 12/1996 | Yamazaki et al. .......... | 358/500 |
| 5,617,131 A | * | 4/1997 | Murano et al. ............ | 347/233 |
| 5,729,269 A | * | 3/1998 | Ohnishi et al. ............ | 347/130 |
| 6,927,789 B2 | | 8/2005 | Ozasa et al. | |
| 6,933,957 B2 | | 8/2005 | Omori et al. | |
| 7,212,224 B2 | | 5/2007 | Nihei et al. | |
| 7,256,815 B2 | | 8/2007 | Suzuki et al. | |
| 7,271,824 B2 | | 9/2007 | Omori et al. | |
| 7,327,379 B2 | | 2/2008 | Nihei et al. | |
| 2005/0089069 A1 | | 4/2005 | Ozasa et al. | |
| 2005/0219354 A1 | | 10/2005 | Omori et al. | |
| 2006/0103718 A1 | * | 5/2006 | Ang ..................... | 347/233 |
| 2006/0110110 A1 | | 5/2006 | Yi et al. | |
| 2006/0285186 A1 | | 12/2006 | Ishida et al. | |
| 2007/0030548 A1 | | 2/2007 | Nihei et al. | |
| 2007/0091163 A1 | | 4/2007 | Omori et al. | |
| 2007/0132828 A1 | | 6/2007 | Ishida et al. | |
| 2008/0088893 A1 | | 4/2008 | Ishida et al. | |
| 2008/0123160 A1 | | 5/2008 | Omori et al. | |
| 2008/0218813 A1 | | 9/2008 | Tanabe et al. | |
| 2008/0225106 A1 | | 9/2008 | Omori et al. | |
| 2008/0239336 A1 | | 10/2008 | Tanabe et al. | |
| 2008/0291259 A1 | | 11/2008 | Nihei et al. | |
| 2008/0298842 A1 | * | 12/2008 | Ishida et al. ............ | 399/221 |
| 2009/0091805 A1 | | 4/2009 | Tanabe et al. | |

FOREIGN PATENT DOCUMENTS

| | | |
|---|---|---|
| EP | 0 828 298 A2 | 3/1998 |
| JP | 59075219 A * | 4/1984 |
| JP | 07178957 A * | 7/1995 |
| JP | 10-84509 | 3/1998 |
| JP | 2001-217366 | 8/2001 |

(Continued)

*Primary Examiner* — Hai C Pham
(74) *Attorney, Agent, or Firm* — Dickstein Shapiro LLP

(57) ABSTRACT

A light source device includes a light source that includes a vertical cavity surface emitting laser; a drive circuit that drives the light source; and a circuit board that includes at least one mounting surface on which the light source and the drive circuit are mounted. The light source is mounted on a first area of the mounting surface, the drive circuit is mounted on a second area of the mounting surface, and a highest end of the first area is at a same height or lower than a lowest end of the second area with respect to a gravity direction.

8 Claims, 15 Drawing Sheets

FOREIGN PATENT DOCUMENTS

| | | |
|---|---|---|
| JP | 2002-271073 | 9/2002 |
| JP | 2004-287292 | 10/2004 |
| JP | 2006-103248 | 4/2006 |
| JP | 2006-147820 | 6/2006 |
| JP | 2006-148128 | 6/2006 |
| JP | 4087133 | 2/2008 |
| WO | WO 2005/093918 A1 | 10/2005 |

\* cited by examiner

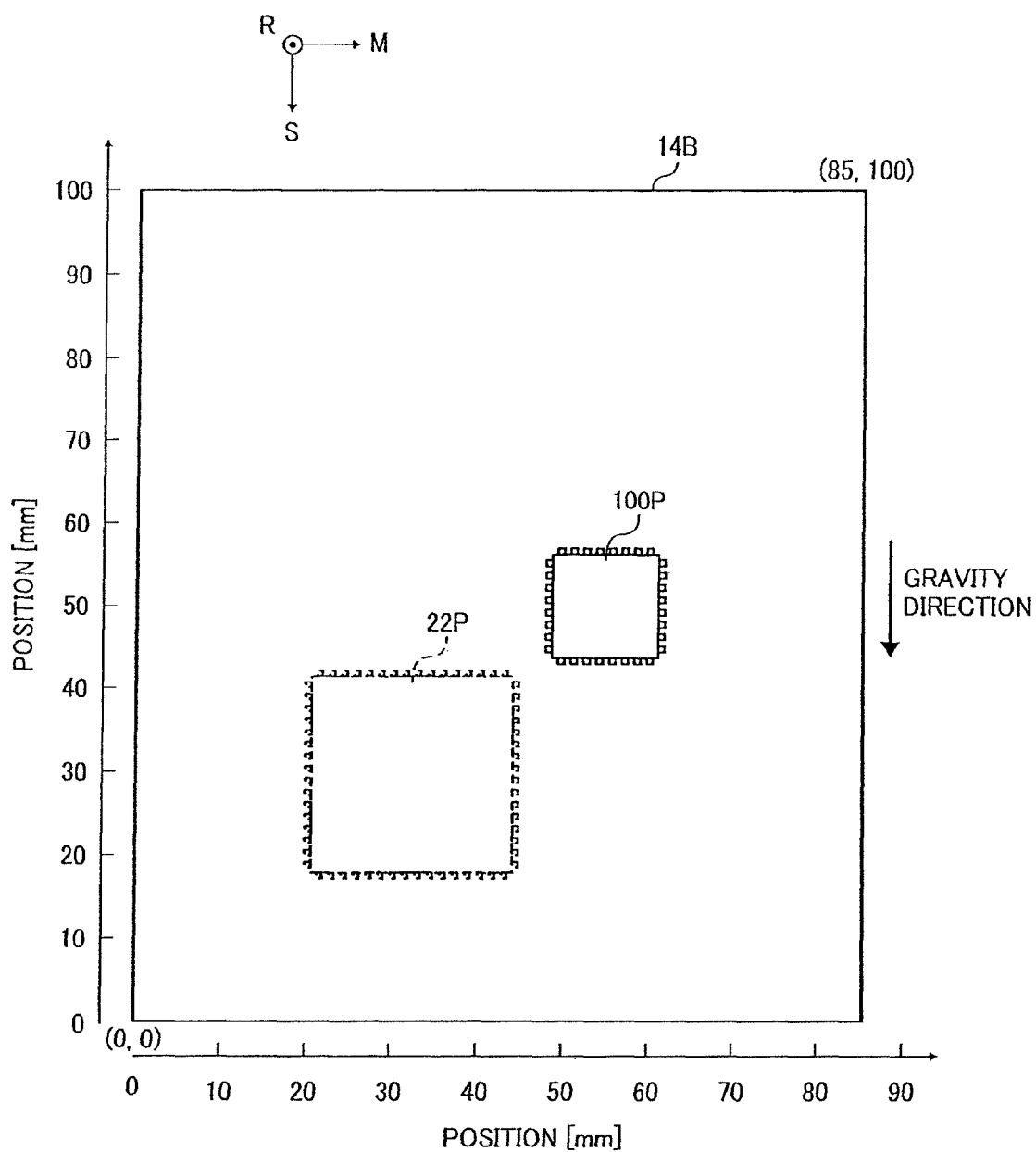

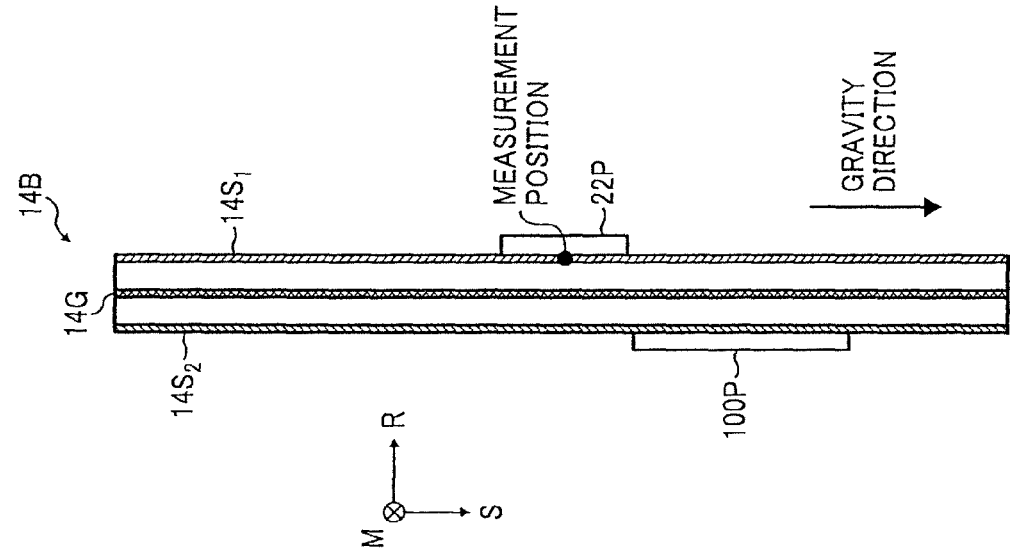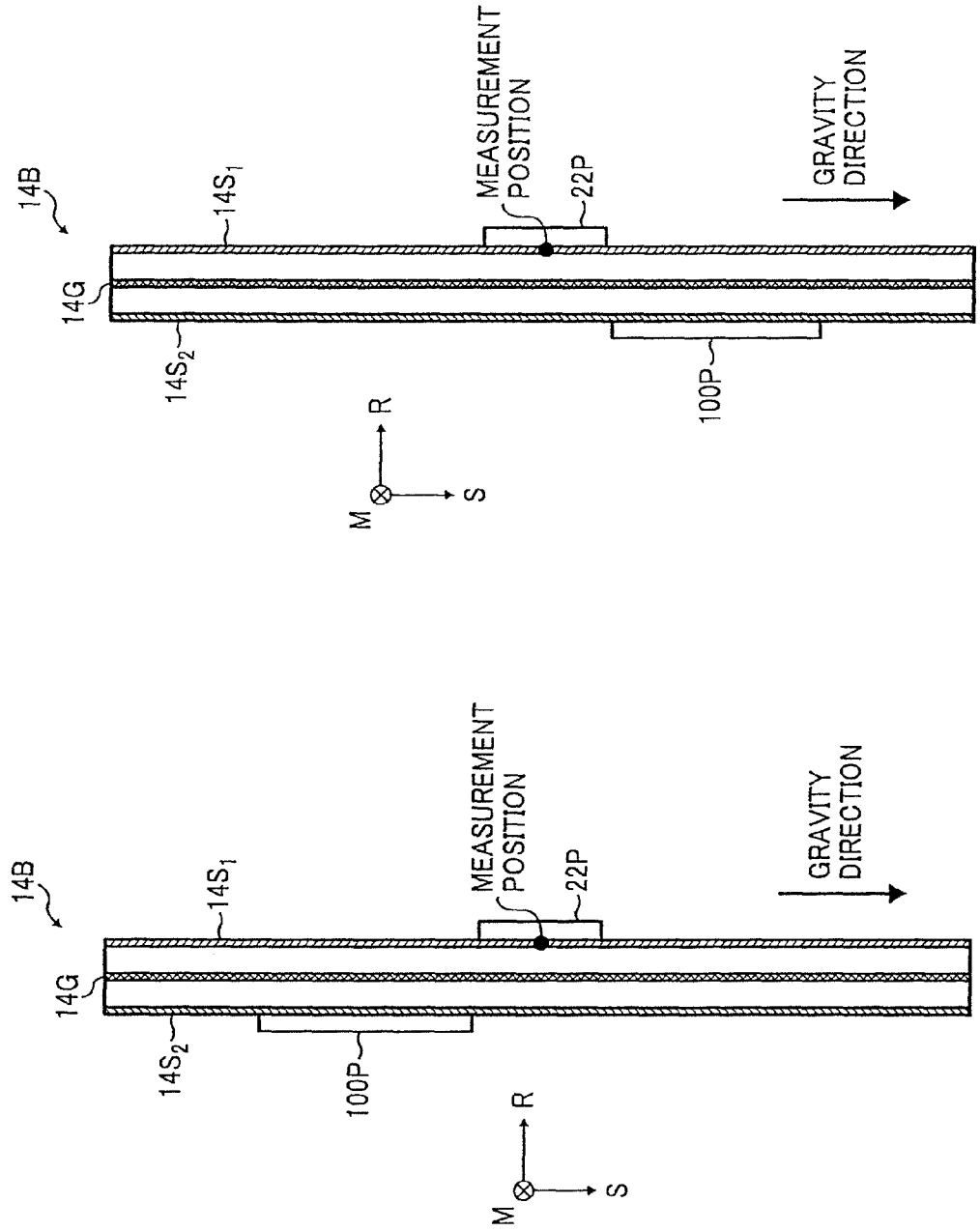

$$\frac{\tau_{86.4} - \tau_{87.9}}{\tau_{86.4}} \times 100 = 10$$

LIGHT SOURCE DEVICE, OPTICAL SCANNING DEVICE, AND IMAGE FORMING APPARATUS

CROSS-REFERENCE TO RELATED APPLICATIONS

The present application claims priority to and incorporates by reference the entire contents of Japanese priority document 2008-151148 filed in Japan on Jun. 10, 2008.

BACKGROUND OF THE INVENTION

1. Field of the Invention

The present invention relates to a light source device, an optical scanning device, and an image forming apparatus.

2. Description of the Related Art

In recent years, in an image forming apparatus such as a laser printer and a digital copying machine, there is an increasing demand for high-speed and high-density printing. A semiconductor laser is generally employed as a light source, and recently, a vertical cavity surface emitting laser (hereinafter, "VCSEL") has been used in addition to an edge emitting semiconductor laser that was used more commonly.

On the other hand, with the advancement of the high-speed and high-density printing, the heating value generated in a drive circuit that supplies a drive signal to the light source tends to increase. The drive circuit is provided normally near the light source to suppress the delay of the drive signal. If the temperature of the light source increases due to the heating of the drive circuit, this may shorten the lifetime of the VCSEL because the VCSEL is weak against heat compared with the edge emitting semiconductor laser, and cause degradation of the image quality.

For example, Japanese Patent Application Laid-open No. 2001-217366 discloses a cooling device for circuit parts. The cooling device is configured to lead heat from heating parts on a circuit board to the outside of the circuit board by means of a heat pipe and radiate heat by a heat radiation unit composed a radiating fin arranged on the heat radiation side of the heat pipe and a fan, thereby efficiently radiating heat out of the device. The cooling device has drastically increased the cooling efficiency while decreasing the heights of the cooling parts.

Japanese Patent Application Laid-open No. 2002-271073 discloses a cooling device that makes it possible to exhaust heat on a circuit board on which highly heating parts such as a microprocessor unit are mounted and cool other heating parts by one cooling fan.

Japanese Patent Application No. 4087133 discloses a cooling structure of an electronic circuit board on which a sink having a fan is mounted for the main heating element.

However, the cooling devices disclosed in Japanese Patent Application Laid-open No. 2001-217366, Japanese Patent Application Laid-open No. 2002-271073 and Japanese Patent Application No. 4087133 become large in size, which is disadvantageous.

SUMMARY OF THE INVENTION

It is an object of the present invention to at least partially solve the problems in the conventional technology.

According to one aspect of the present invention, there is provided a light source device including a light source that includes a vertical cavity surface emitting laser; a drive circuit that drives the light source; and a circuit board that includes at least one mounting surface on which the light source and the drive circuit are mounted. The light source is mounted on a first area of the mounting surface, the drive circuit is mounted on a second area of the mounting surface, and a highest end of the first area is at a same height or lower than a lowest end of the second area with respect to a gravity direction.

Moreover, according to another aspect of the present invention, there is provided an optical scanning device that scans a scanning surface with light. The optical scanning device includes a light source device including a light source that includes a vertical cavity surface emitting laser, a drive circuit that drives the light source, and a circuit board that includes at least one mounting surface on which the light source and the drive circuit are mounted, wherein the light source is mounted on a first area of the mounting surface, the drive circuit is mounted on a second area of the mounting surface, and a highest end of the first area is at a same height or lower than a lowest end of the second area with respect to a gravity direction; a deflector that deflects light output from the light source device; and a scanning optical system that focuses the light deflected by the deflector on the scanning surface.

Furthermore, according to still another of the present invention, there is provided an image forming apparatus including at least one image carrier; and at least one optical scanning device. The optical scanning device scans the image carrier with light that contains image information and includes a light source device including a light source that includes a vertical cavity surface emitting laser, a drive circuit that drives the light source, and a circuit board that includes at least one mounting surface on which the light source and the drive circuit are mounted, wherein the light source is mounted on a first area of the mounting surface, the drive circuit is mounted on a second area of the mounting surface, and a highest end of the first area is at a same height or lower than a lowest end of the second area with respect to a gravity direction; a deflector that deflects light output from the light source device; and a scanning optical system that focuses the light deflected by the deflector on the image carrier.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 11 is a schematic diagram for explaining a comparison example of the light source device;

FIG. 12A is a schematic diagram for explaining a measurement position of temperature in the present embodiment;

FIG. 12B is a schematic diagram for explaining a measurement position of temperature in the comparison example;

DETAILED DESCRIPTION OF THE PREFERRED EMBODIMENTS

Figure 1:
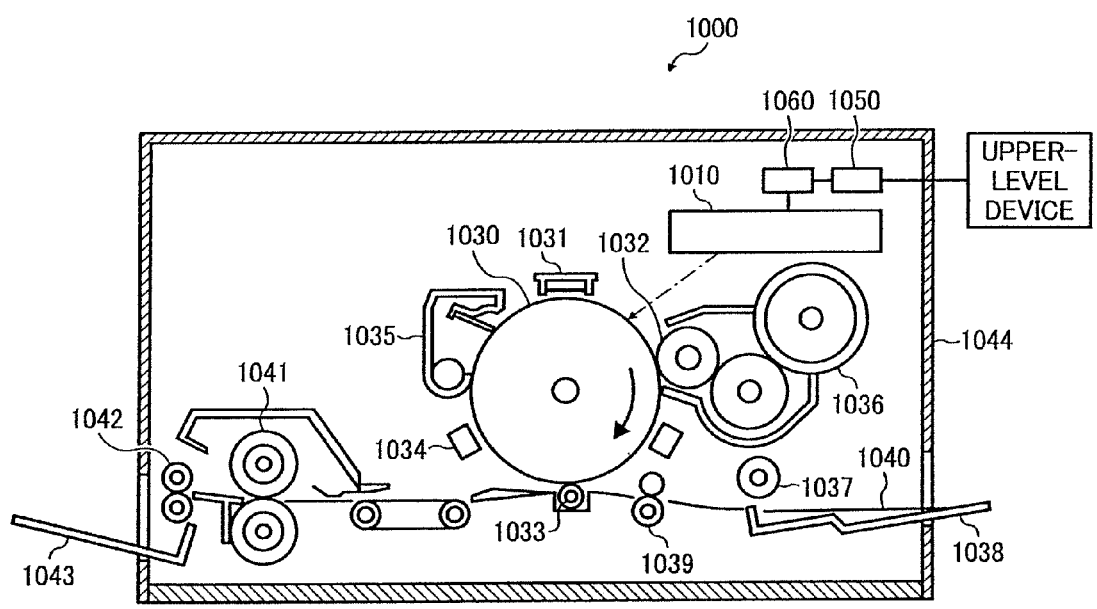
FIG. 1 is a schematic diagram of a laser printer according to an embodiment of the present invention.

Exemplary embodiments of the present invention are described in detail below with reference to FIGS. 1 to 15B. FIG. 1 is a schematic diagram of a laser printer 1000 as an image forming apparatus according to an embodiment of the present invention.

The laser printer 1000 includes an optical scanning device 1010, a photosensitive element 1030, a charging unit 1031, a developing roller 1032, a transfer charging unit 1033, a neutralizing unit 1034, a cleaning unit 1035, a toner cartridge 1036, a sheet feeding roller 1037, a sheet feeding tray 1038, a pair of registration rollers 1039, a fixing roller 1041, a sheet discharging roller 1042, a catch tray 1043, a communication control device 1050, and a printer control device 1060 that controls above-mentioned each unit as a whole. These units are housed in respective predetermined positions in a printer housing 1044.

The communication control device 1050 controls a two-way communication with an upper-level device (such as a personal computer) through a network or the like.

The photosensitive element 1030 is a cylindrical member on which a photosensitive layer is formed. That is, the surface of the photosensitive element 1030 is a scanning surface. The photosensitive element 1030 rotates in a direction indicated by an arrow in FIG. 1.

The charging unit 1031, the developing roller 1032, the transfer charging unit 1033, the neutralizing unit 1034, and the cleaning unit 1035 are arranged near the surface of the photosensitive element 1030 in this order in a rotation direction of the photosensitive element 1030.

The charging unit 1031 uniformly charges the surface of the photosensitive element 1030.

The optical scanning device 1010 irradiates the surface of the photosensitive element 1030, which is charged by the charging unit 1031, with a light flux modulated based on image data from the upper-level device. With this, a latent image corresponding to the image data is formed on the surface of the photosensitive element 1030. The latent image formed on the surface of the photosensitive element 1030 moves in the direction of the developing roller 1032 accompanied with the rotation of the photosensitive element 1030. The configuration of the optical scanning device 1010 will be described later.

Toner is stored in the toner cartridge 1036, which is supplied to the developing roller 1032.

The developing roller 1032 causes the toner supplied from the toner cartridge 1036 to adhere to the latent image to visualize the latent image. The latent image with the toner adhered thereto (hereinafter, "the toner image") moves in the direction of the transfer charging unit 1033 accompanied with the rotation of the photosensitive element 1030.

Recording sheets 1040 are stored in the sheet feeding tray 1038, and the sheet feeding roller 1037 is arranged near the sheet feeding tray 1038. The sheet feeding roller 1037 picks up the recording sheets 1040 one by one from the sheet feeding tray 1038, and conveys the recording sheet 1040 to the registration rollers 1039. The registration rollers 1039 once hold the recording sheet 1040 picked up by the sheet feeding roller 1037, and convey the recording sheet 1040 to a nip between the photosensitive element 1030 and the transfer charging unit 1033 in accordance with the rotation of the photosensitive element 1030.

To electrically attract the toner on the surface of the photosensitive element 1030 to the recording sheet 1040, a voltage with reversed polarity to the toner is applied to the transfer charging unit 1033. With this voltage, the toner image on the surface of the photosensitive element 1030 is transferred onto the recording sheet 1040. The recording sheet 1040 onto which the toner image is transferred is sent to the fixing roller 1041.

In the fixing roller 1041, heat and pressure is applied to the recording sheet 1040, so that the toner is fixed to the recording sheet 1040. The recording sheet 1040 with the toner image fixed thereto is sent to the catch tray 1043 through the sheet discharging roller 1042 and stacked sequentially on the catch tray 1043.

The neutralizing unit 1034 neutralizes the surface of the photosensitive element 1030.

The cleaning unit 1035 removes the toner (residual toner) remaining on the surface of the photosensitive element 1030. The surface of the photosensitive element 1030 from which the residual toner is removed returns again to the position opposed to the charging unit 1031.

Next, the configuration of the optical scanning device 1010 is explained.

Figure 2:
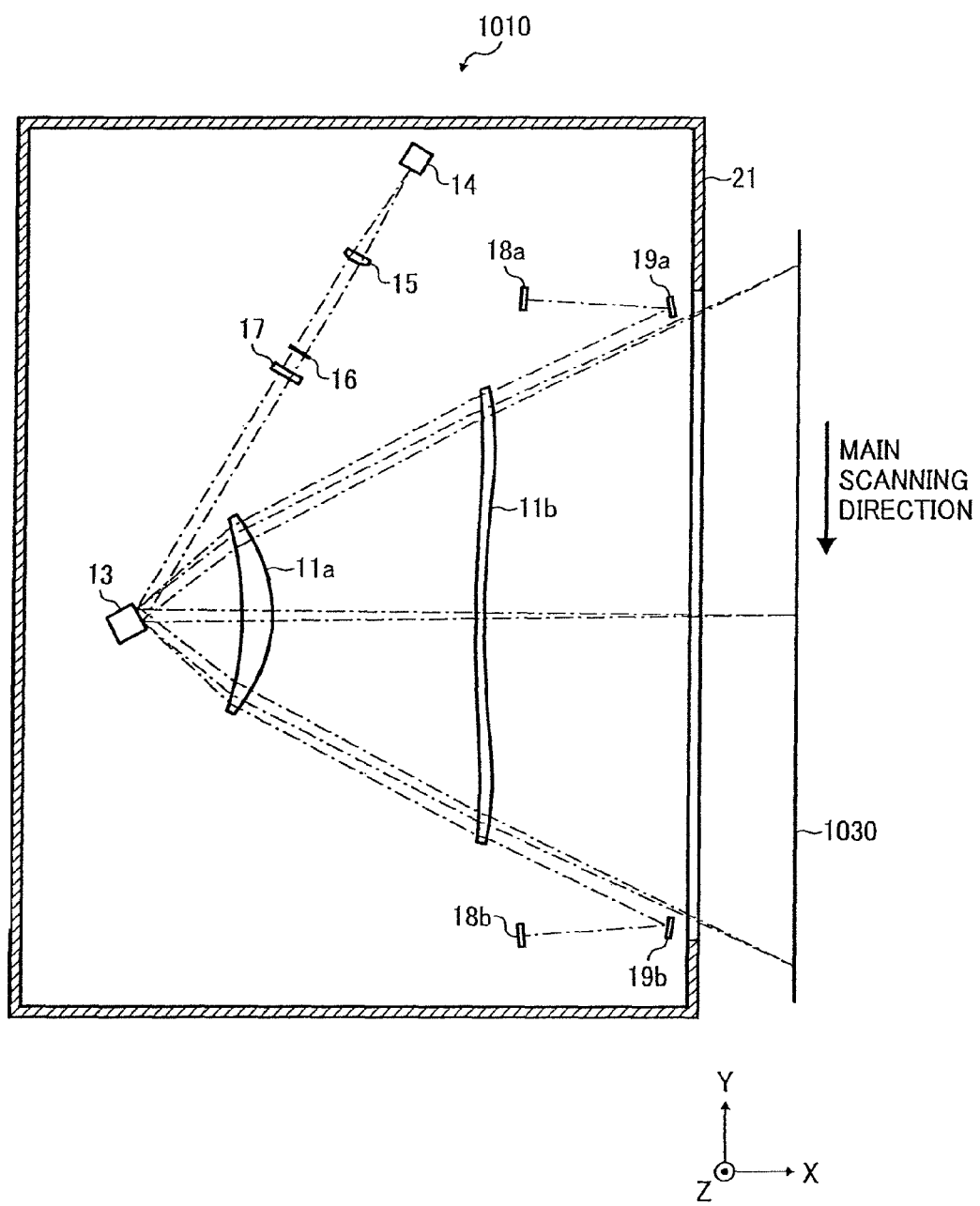
FIG. 2 is a schematic diagram illustrating a configuration of an optical scanning device shown in FIG. 1.

As shown in FIG. 2, the optical scanning device 1010 includes a light source device 14, a coupling lens 15, an aperture plate 16, a cylindrical lens 17, a polygon mirror 13, an fθ lens 11a, a toroidal lens 11b, light detection sensors 18a and 18b, and light detection mirrors 19a and 19b. These units are allocated at respective predetermined positions inside a housing 21.

In addition, in the present specification, in the three dimensional xyz Cartesian coordinate system, a direction along the longitudinal direction of the photosensitive element 1030 is explained as the Y-axis direction and a direction along the optical axes of the fθ lens 11a and the toroidal lens 11b is explained as the X-axis direction. Moreover, hereinafter, a direction corresponding to a main-scanning direction is referred to as "a main-scanning corresponding direction", and a direction corresponding to a sub-scanning direction is referred to as "a sub-scanning corresponding direction" as a matter of convenience.

The coupling lens 15 converts the light flux emitted from the light source device 14 into roughly a parallel light.

The aperture plate 16 has an opening and defines the beam diameter of the light flux passed through the coupling lens 15.

The cylindrical lens 17 focuses the light flux that has passed through the opening of the aperture plate 16 near the deflection reflection surface of the polygon mirror with respect to the Z-axis direction.

An optical system arranged on the light path between the light source device 14 and the polygon mirror 13 is also referred to as a pre-deflector optical system. In the present embodiment, the pre-deflector optical system includes the coupling lens 15, the aperture plate 16, and the cylindrical lens 17.

The polygon mirror 13 has four plane mirrors, and each mirror becomes a respective deflecting reflection surface. The polygon mirror rotates at a constant speed around an axis parallel to the Z-axis direction, and deflects the light flux from the cylindrical lens 17.

The fθ lens 11a is arranged on the light path of the light flux that is deflected by the polygon mirror 13.

The toroidal lens 11b is arranged on the light path of the light flux through the fθ lens 11a. In addition, the light flux, passed through the toroidal lens 11b, is irradiated to the surface of the photosensitive element 1030 to form a light spot. This light spot moves to the longitudinal direction of the photosensitive element 1030 accompanied with the rotation of the polygon mirror 13. That is, the light spot scans the photosensitive element 1030. On this occasion, the moving direction of the light spot is the "main-scanning direction" and the rotating direction of the photosensitive element 1030 is the "sub-scanning direction".

An optical system arranged on the light path between the polygon mirror 13 and the photosensitive element 1030 is also referred to as a scanning optical system. In the present embodiment, the scanning optical system includes the fθ lens 11a and the toroidal lens 11b. It is applicable that at least one reflecting mirror is arranged in at least one side on the light path between the fθ lens 11a and the toroidal lens 11b, and on the light path between the toroidal lens 11b and the photosensitive element 1030.

A part of the light flux before writing among the light flux that is deflected by the polygon mirror 13 and passes through the scanning optical system enters in the light detection sensor 18a through the light detection mirror 19a. In addition, a part of the light flux after writing among the light flux that is deflected by the polygon mirror 13 and passes through the scanning optical system enters in the light detection sensor 18b through the light detection mirror 19b.

Each of the light detection sensors 18a and 18b generates an electric signal (photoelectric conversion signal) in accordance with the amount of light received, and outputs the electric signal to a drive control unit 22.

Figure 3:
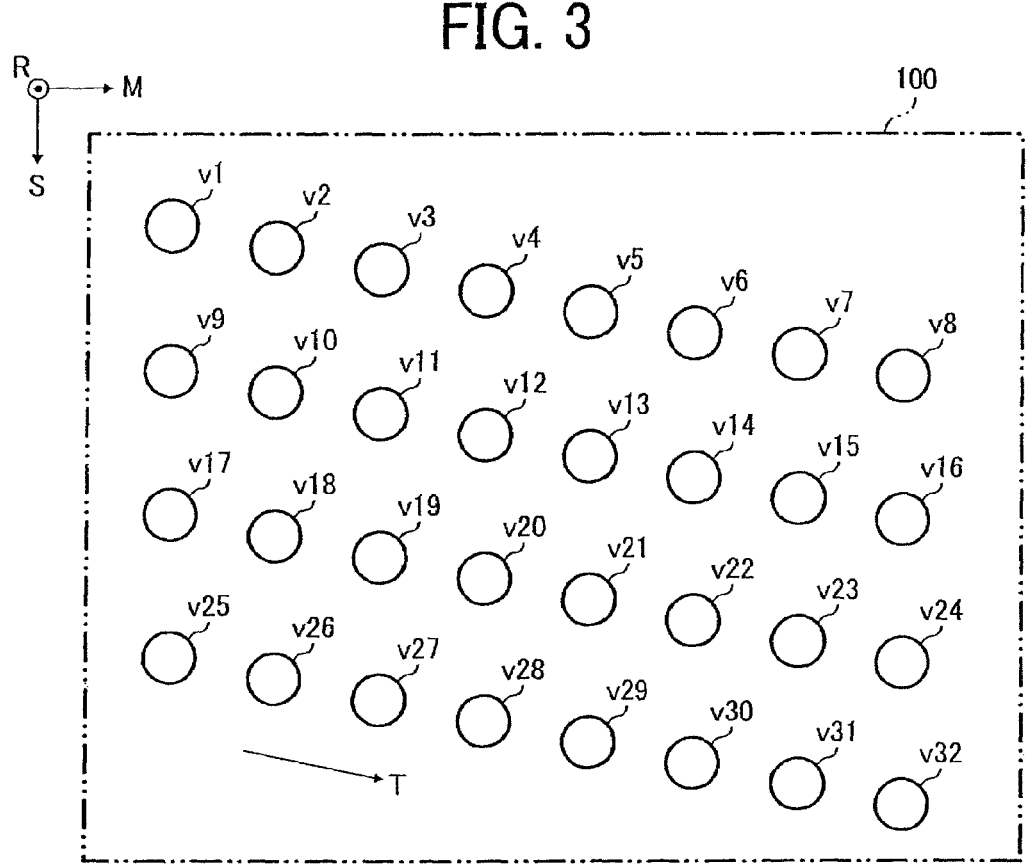
FIG. 3 is a schematic diagram of an array of a plurality of light emitting units (two-dimensional array) of the light source device shown in FIG. 2.

The light source device 14 includes a two-dimensional array 100 that is formed on one substrate on which 32 light emitting units (v1 to v32) are arrayed two-dimensionally, as shown in FIG. 3 as an example. In FIG. 3, M direction represents the main-scanning corresponding direction and S direction represents the sub-scanning corresponding direction. In addition, T direction represents a direction that is tilted from the M direction towards S direction. Moreover, R direction represents a direction in which the light flux is emitted from each light emitting unit.

The two-dimensional array 100 has four light emitting unit lines in each of which eight light emitting units are arranged at even intervals along the T direction. In addition, the light emitting unit lines are arranged at even intervals along the S direction so that when all the light emitting units are orthographically projected on virtual lines stretching in the S direction they become even intervals. In addition, in the present specification, "light emitting unit interval" means the center-to-center distance between two light emitting units.

In addition, each light emitting unit is a VCSEL with a design oscillation wavelength of 780-nanometer band. That is, the two-dimensional array 100 is a surface emitting laser array having 32 light emitting units.

Figure 4:
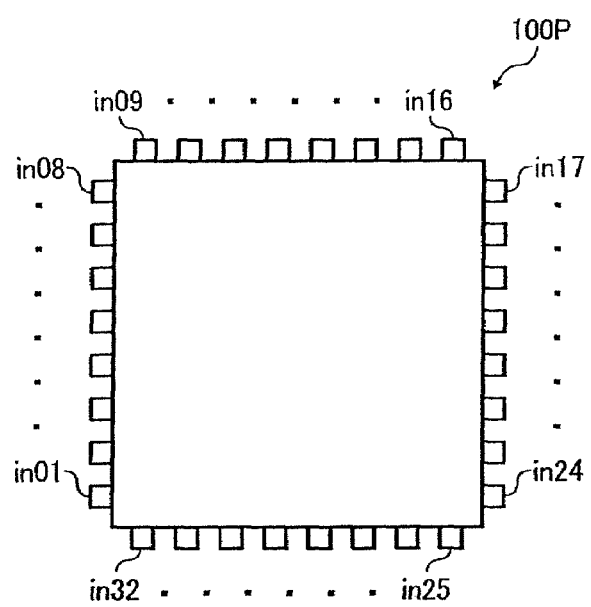
FIG. 4 is a schematic diagram of a light source package in which the two-dimensional array is stored.

As shown in FIG. 4 as an example, the two-dimensional array 100 is stored in a quad flat package (QFP) 100P. Terminals in01 to in32 in FIG. 4 correspond to v1 to v32, respectively, and they are input terminals that the respective drive signals are input. Hereinafter, the package 100P in which the two-dimensional array 100 is stored is also referred to as "the light source package 100P" as a matter of convenience. In addition, the outer shape of the light source package 100P is a square with a side length of 14 millimeters (mm).

Figure 5:
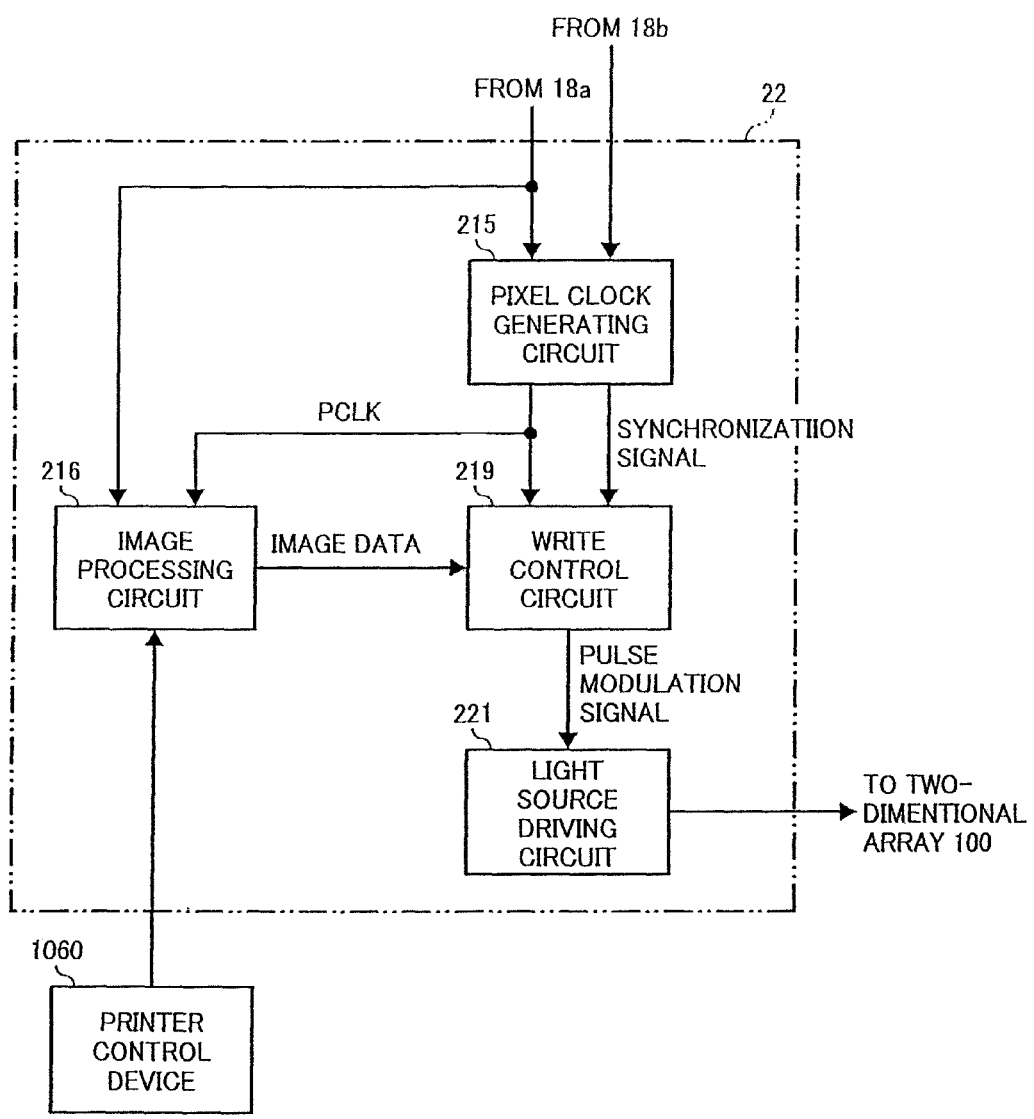
FIG. 5 is a block diagram of a drive control circuit of the light source device.

In addition, the light source device 14 includes the drive control unit 22 for driving the two-dimensional array 100. The drive control unit 22 includes, as shown in FIG. 5 as an example, a pixel clock generation circuit 215, an image processing circuit 216, a write control circuit 219, and a light source driving circuit 221. In addition, arrows in FIG. 5 represent the flows of typical signals and information, and do not represent all the connection relationships among blocks.

The pixel clock generation circuit 215 obtains the time that is needed for a light flux to scan between the light detection sensors 18a and 18b based on the output signal of the light detection sensor 18a and the output signal of the light detection sensor 18b, sets a frequency so that the predetermined number of pulses falls within the time, and generates a pixel clock signal PCLK of the frequency. The generated pixel clock signal PCLK is supplied to the image processing circuit 216 and the write control circuit 219. In addition, the output signal of the light detection sensor 18a is supplied to the write control circuit 219 as a synchronization signal.

The image processing circuit 216 rasterizes the image information received from the upper-level device through the printer control device 1060 and performs a predetermined halftone processing. Thereafter, the image processing circuit 216 generates image data that expresses each pixel tone with the pixel clock signal PCLK as a reference for each light emitting unit. In addition, the image processing circuit 216 outputs the image data to the write control circuit 219 in synchronization with the pixel clock signal PCLK when it detects the start of scanning based on the light detection sensor 18a.

The write control circuit 219 generates a pulse modulation signal based on the image data from the image processing circuit 216, and the pixel clock signal PCLK and the synchronization signal from the pixel clock generation circuit 215.

The light source driving circuit 221 drives each light emitting unit of the two-dimensional array 100 based on the pulse modulation signal from the write control circuit 219.

Figure 6:
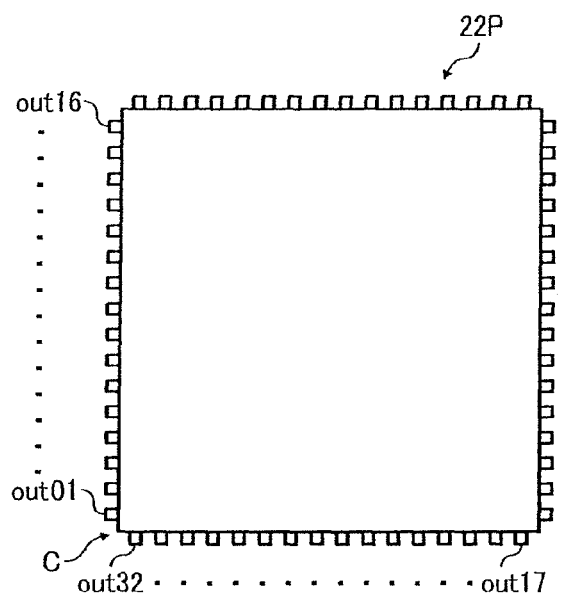
FIG. 6 is a schematic diagram of a drive package in which the drive control circuit is stored.

The drive control unit 22 is stored in a QFP type package 22P as shown in FIG. 6 as an example. Therefore, the pixel clock generation circuit 215, the image processing circuit 216, the write control circuit 219, and the light source driving circuit 221 are arranged close to each other. Because these circuits are arranged close to each other, a high-frequency clock and various signals between the circuits can be received with good quality, thereby enabling to accomplish high-speed and high-density image formation. The terminals out01 to out32 in FIG. 6, corresponding to the light emitting units v1 to v32, are output terminals to which the respective drive signals are output. Hereinafter, the package 22P in which the drive control unit 22 is stored is also referred to as "the drive package 22P" as a matter of convenience. In addition, the outer shape of the drive package 22P is a square with a side length of 28 mm. Terminals out01 to out32 are arranged near the two sides that form a corner portion C of the drive package 22P.

Figure 7:
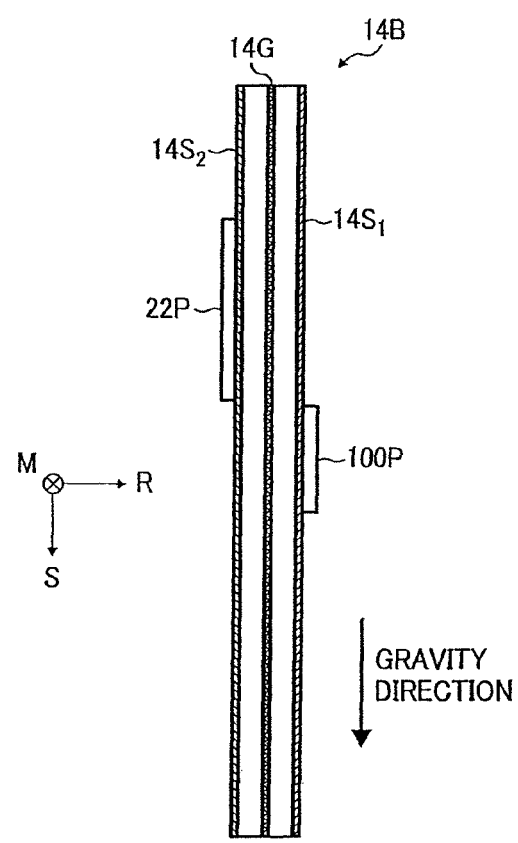
FIG. 7 is a schematic diagram of the light source device for explaining a control board on which the light source package and the drive package are mounted.

The light source device 14 includes a control board 14B on which the light source package 100P and the drive package 22P are mounted, as shown in FIG. 7 as an example. An unwoven glass fabric base epoxy resin copper clad laminate having three copper foil layers (a first layer 14S₁, a second layer 14G, a third layer 14S₂) is used as the control board 14B. Among the three copper foil layers, the first layer 14S₁ and the third layer 14S₂ are used for signal layers, and the second layer 14G is used for a ground layer. Connections between the signal layers can be performed via through holes (not shown) provided at a plurality of positions. In addition, the outer shape of the control board 14B is a rectangle having side lengths of 85 mm in the M direction and 100 mm in the S direction. Moreover, the S direction coincides with a gravity direction in which gravity is acting.

In the present embodiment, the light source package 100P is mounted on the +R side of the control board 14B, and the drive package 22P is mounted on the −R side of the control board 14B.

Figure 8:
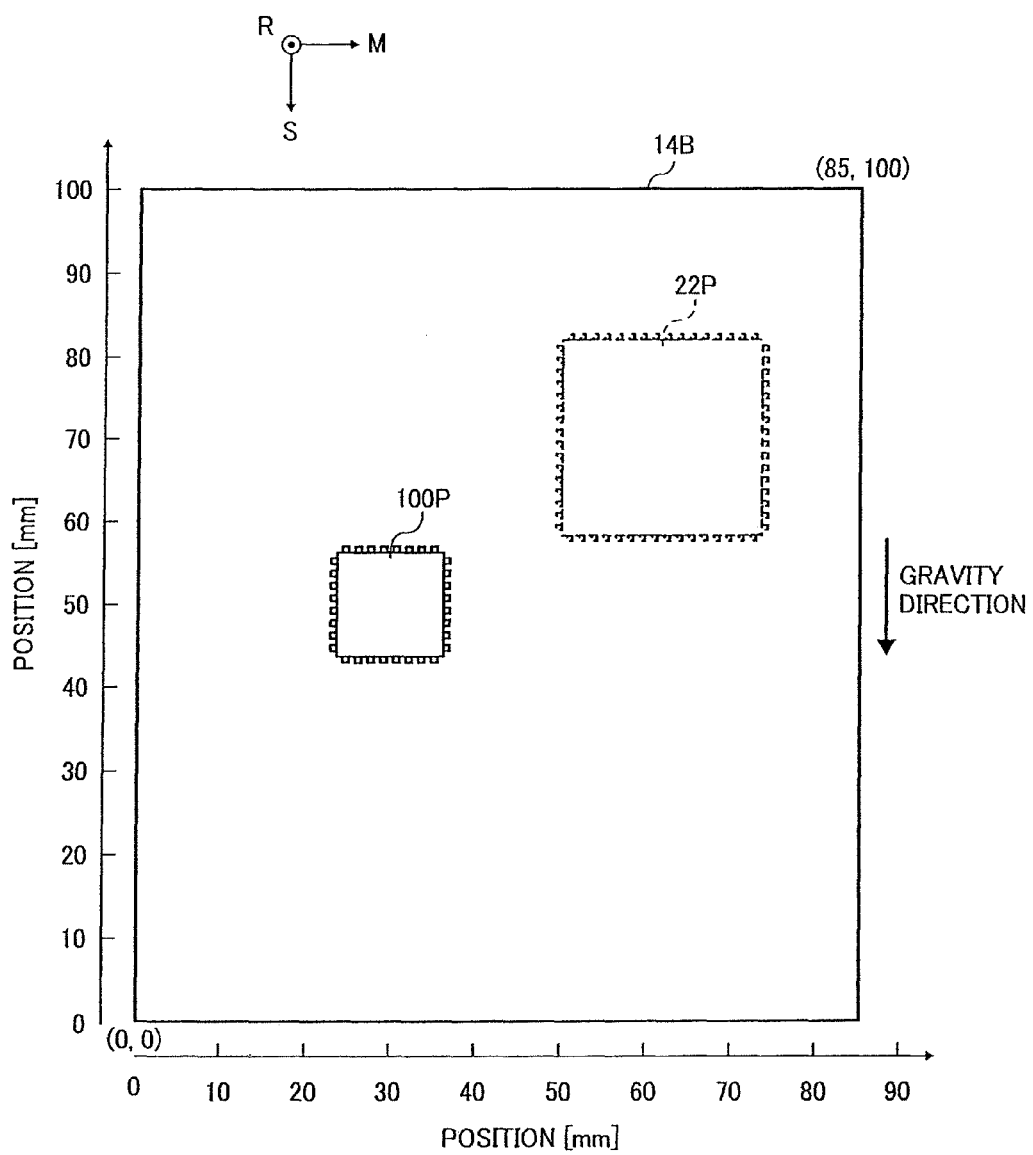
FIG. 8 is another schematic diagram of the light source device for explaining the control board on which the light source package and the drive package are mounted.

Hereinafter, when viewed from the R direction, as shown in FIG. 8, the corner at the left bottom of the control board 14B is set to the origin to express a position on the control board 14B with the distance (mm) from the origin in the M direction and the distance (mm) from the origin in the S direction.

The center position of the light source package 100P is (30, 50) and the center position of the drive package 22P is (62, 72). That is, with respect to the gravity direction, the area (hereinafter, referred to also as "the light source mounting area" as a matter of convenience) where the light source package 100P is mounted on the control board 14B is located lower than the area (hereinafter, referred to also as "the drive circuit mounting area" as a matter of convenience) where the drive package 22P is mounted on the control board 14B, and the highest position in the light source mounting area is located lower than the lowest position in the drive circuit mounting area. In addition, with respect to the M direction that is perpendicular to the gravity direction and parallel to the mounting surface of the control board 14B, the center position of the light source mounting area and the center position of the drive circuit mounting area are different from each other.

Figure 9:
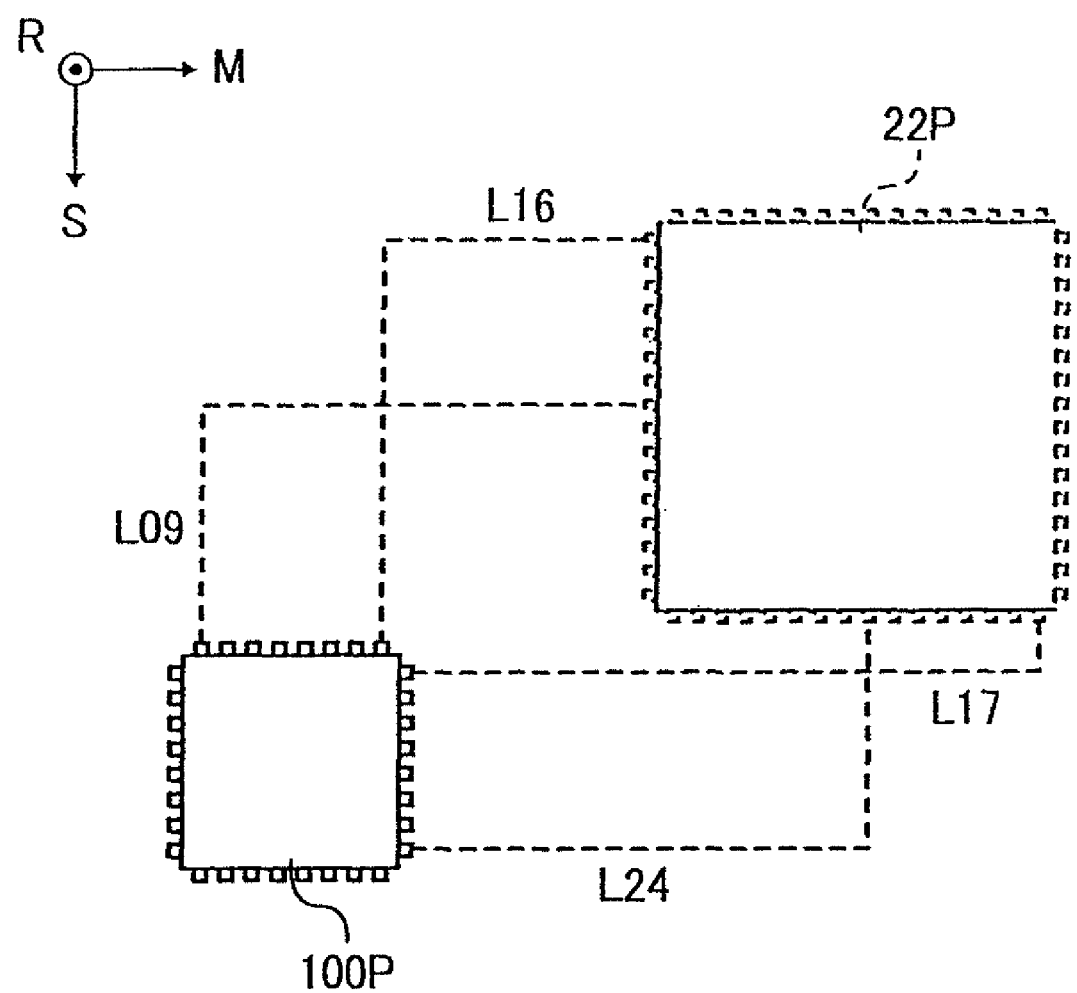
FIG. 9 is a schematic diagram for explaining a wiring example to connect the light source package with the drive package.

As shown in FIG. 9 as an example, the terminals out01 to out32 of the drive package 22P are electrically connected to the terminals in01 to in32 of the light source package 100P through wirings L01 to L32, respectively. The variation in length of the wirings L01 to L32 is small. In FIG. 9, only a part of the wirings is shown. These wirings are provided through the signal layers of the first layer 14S₁ and the third layer 14S₂.

Figure 10:
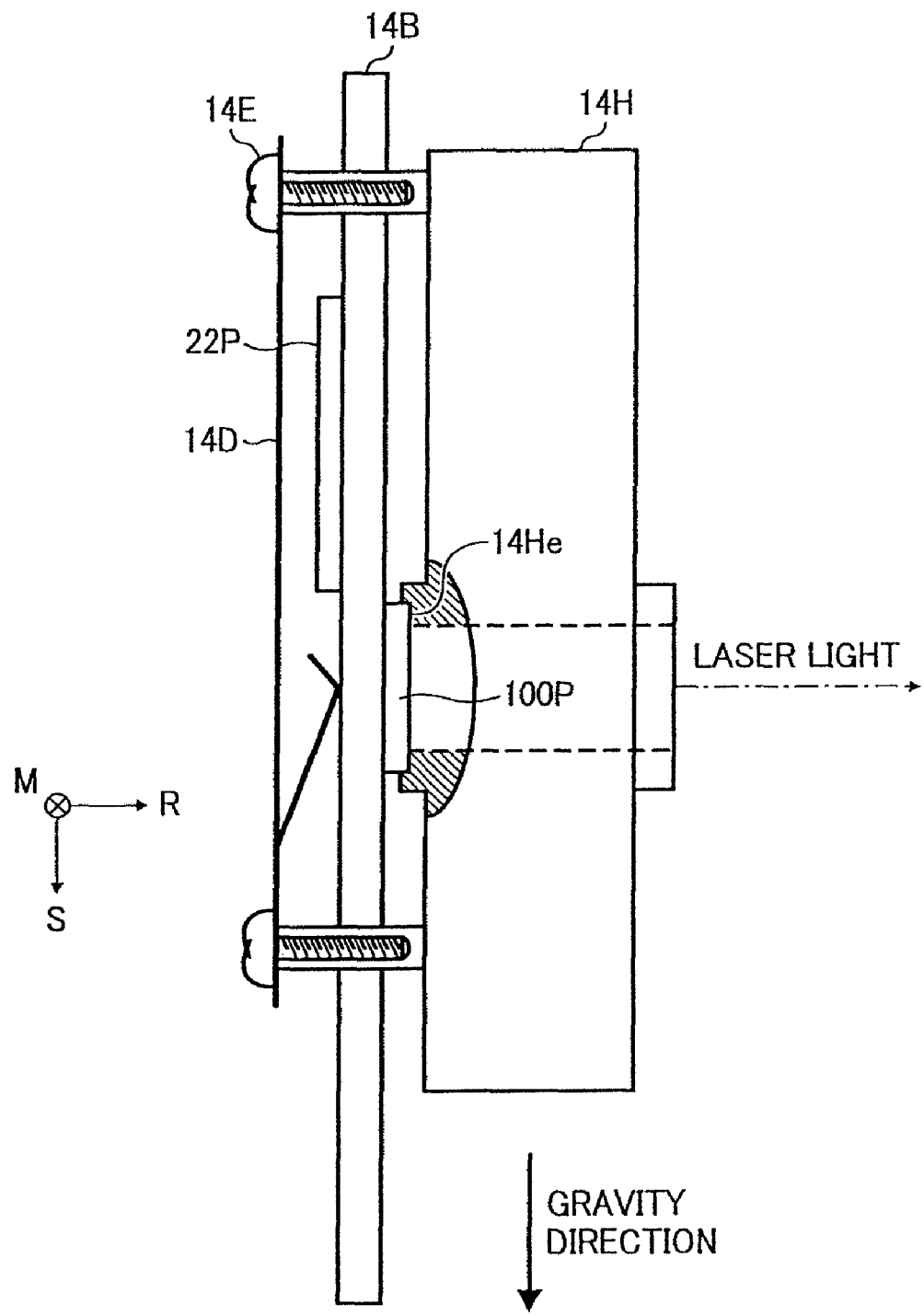
FIG. 10 is a schematic diagram for explaining a holding unit of the light source device.

In addition, the light source device 14 includes, as shown in FIG. 10 as an example, a holding unit 14H on the +R side of the control board 14B. In the holding unit 14H, a through-hole serving as the passage of the light flux from the light source package 100P is formed. An end surface 14He in a portion of the −R side on which the through-hole is formed in the holding unit 14H is in contact with the periphery of the light source package 100P, thereby enabling to release the heat of the light source package 100P through the holding unit 14H. In addition, the holding unit 14H is fixed at a predetermined position in the housing 21.

The control board 14B is biased toward the +R direction by a leaf spring 14D, thereby securing the contact of the holding unit 14H with the light source package 100P.

In FIG. 11, a comparison example of the light source device 14 is shown. In this comparison example, the center position of the light source package 100P is (55, 50) and the center position of the drive package 22P is (33, 28). That is, with respect to the gravity direction, the light source mounting area is located higher than the drive circuit mounting area, and the lowest position in the light source mounting area is located higher than the highest position in the drive circuit mounting area.

Figure 13:
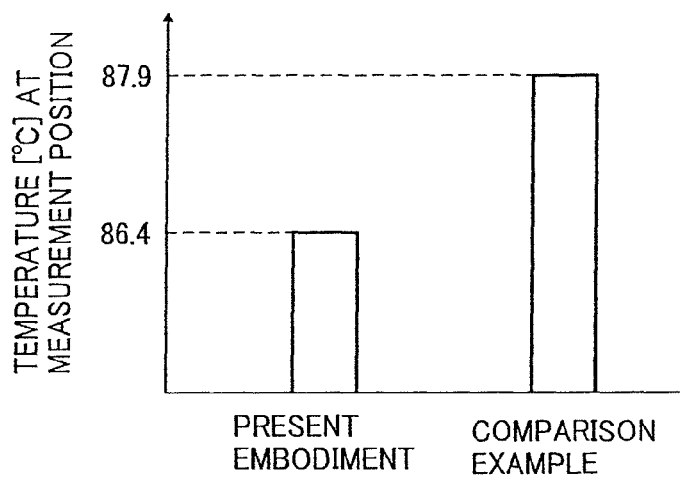
FIG. 13 is a graph for explaining a result of a computer simulation of an element temperature.

Computer simulations are performed for the temperature variations near the light source package 100P when the drive package 22P generates heat in the present embodiment and the comparison example, respectively. The temperature measurement position in the present embodiment is shown in FIG. 12A, and the temperature measurement position in the comparison example is shown in FIG. 12B. A calculation results (temperatures (° C.) at various measurement points) when the heat value of the drive package 22P is 5 Watts (W) are shown in FIG. 13. As is clear from FIG. 13, the temperature increase in the present embodiment is lower than that in the comparison example. That is, in the present embodiment, the temperature increase of the light source package 100P can be suppressed compared with the conventional case.

Figure 14:
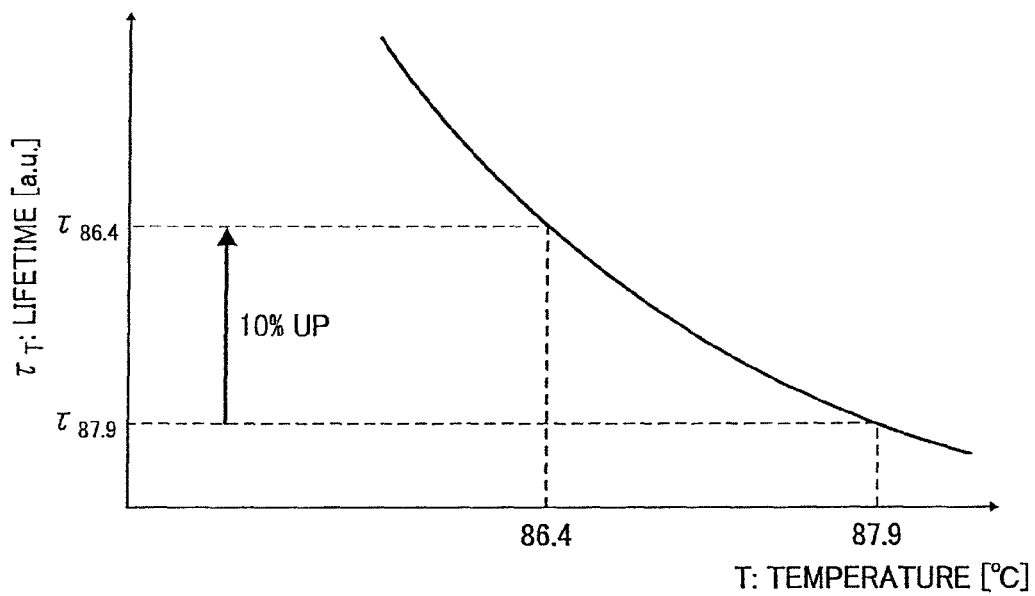
FIG. 14 is a graph for explaining a relationship between lifetime and temperature of the light emitting unit.

A relationship between the lifetime of a surface emitting laser and the device temperature thereof is shown in FIG. 14. In FIG. 14, a lifetime $\tau_T$ of a plurality of surface emitting laser elements each having a different element temperature T is measured, and the measurement result thereof is fitted to a general Arrhenius equation ($\tau_T = C \cdot \exp(K/T)$, where C and K are constants). The drive current is feedback-controlled so that the optical output becomes constant, and the elapsed time when the drive current becomes 120% or more of the initial value is defined as the lifetime. According to this relationship, in the present embodiment, the lifetime becomes longer by about 10% than the comparison example.

As is clear from the explanation described above, in the light source device 14 according to the present embodiment, the light source is configured with the two-dimensional array 100, the drive circuit is configured with the drive control unit 22, and the circuit board is configured with the control board 14B.

As explained above, the light source device 14 according to the present embodiment includes the two-dimensional array 100, the drive control unit 22 that drive the two-dimensional array 100, and the control board 14B having a mounting surface on which the two-dimensional array 100 and the drive control unit 22 are mounted. The mounting surface of the control board 14B is parallel to the gravity direction, the area where the two-dimensional array 100 is mounted is located lower than the area where the drive control unit 22 is mounted with respect to the gravity direction, and the highest position in the area where the two-dimensional array 100 is mounted is located lower than the lowest position in the area where the drive control unit 22 is mounted.

Air heated by the heat generated at the drive control unit 22 moves mainly upward because the heated air becomes lighter than surrounding air. Therefore, the heat generated at the drive control unit 22 can be suppressed from moving toward the two-dimensional array 100, thereby enabling to suppress the temperature increase of the two-dimensional array 100 without increasing the size of the device.

In addition, because the holding unit 14H is in contact with the periphery of the light source package 100P, the temperature increase of the two-dimensional array 100 can be further suppressed.

Moreover, with respect to the M direction that is perpendicular to the gravity direction and parallel to the mounting surface of the control board 14B, because the center position of the area where the light source package 100P is mounted and the center position of the area where the drive package 22P is mounted are different from each other, the variation in length of the wirings L01 to L32 can be made small. That is, it is possible to perform equal length wiring. With this, the rise characteristics of each light emitting unit can be made nearly the same with each other.

Figure 15A:
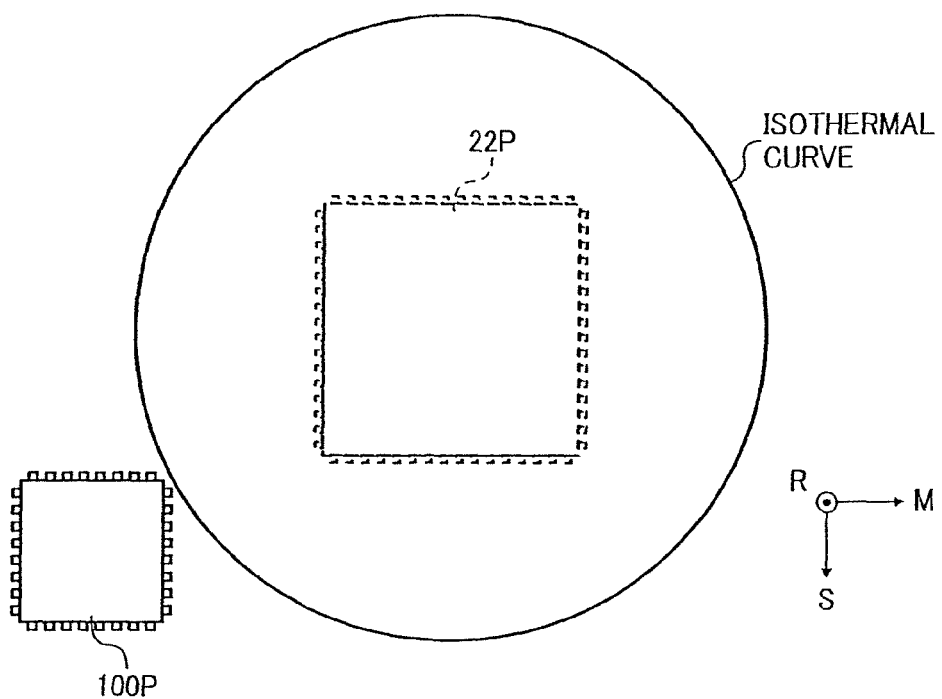
FIGS. 15A and 15B are schematic diagrams each for explaining a relationship between position of the light source package with respect to the drive package and isothermal curve.
Figure 15B:
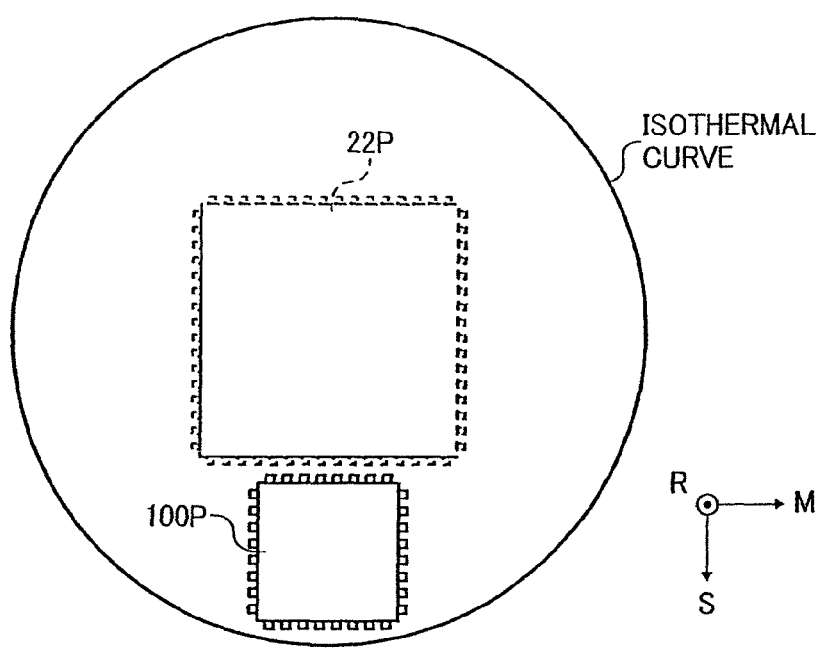

FIGS. 15A and 15B illustrate isothermal curves at certain times and at certain temperatures when it is assumed that the center of the drive package 22P becomes a heat source and the heat transfers isotropically. As is clear from FIGS. 15A and 15B, with respect to the M direction, if the center position of the light source package 100P differs from the center position of the drive package 22P, the influence of heat can be made smaller than in the case where both center positions coincide with each other. That is, the temperature increase of the two-dimensional array 100 can be further suppressed.

According to the optical scanning device 1010 of the present embodiment, because it includes the light source device 14 that can suppress the temperature increase of the two-dimensional array 100, it can perform a stable optical scanning without increasing the size of the device.

Furthermore, according to the laser printer 1000 of the present embodiment, because it includes the optical scanning device 1010, it can form a high quality image without increasing the size of the device.

Figure 16:
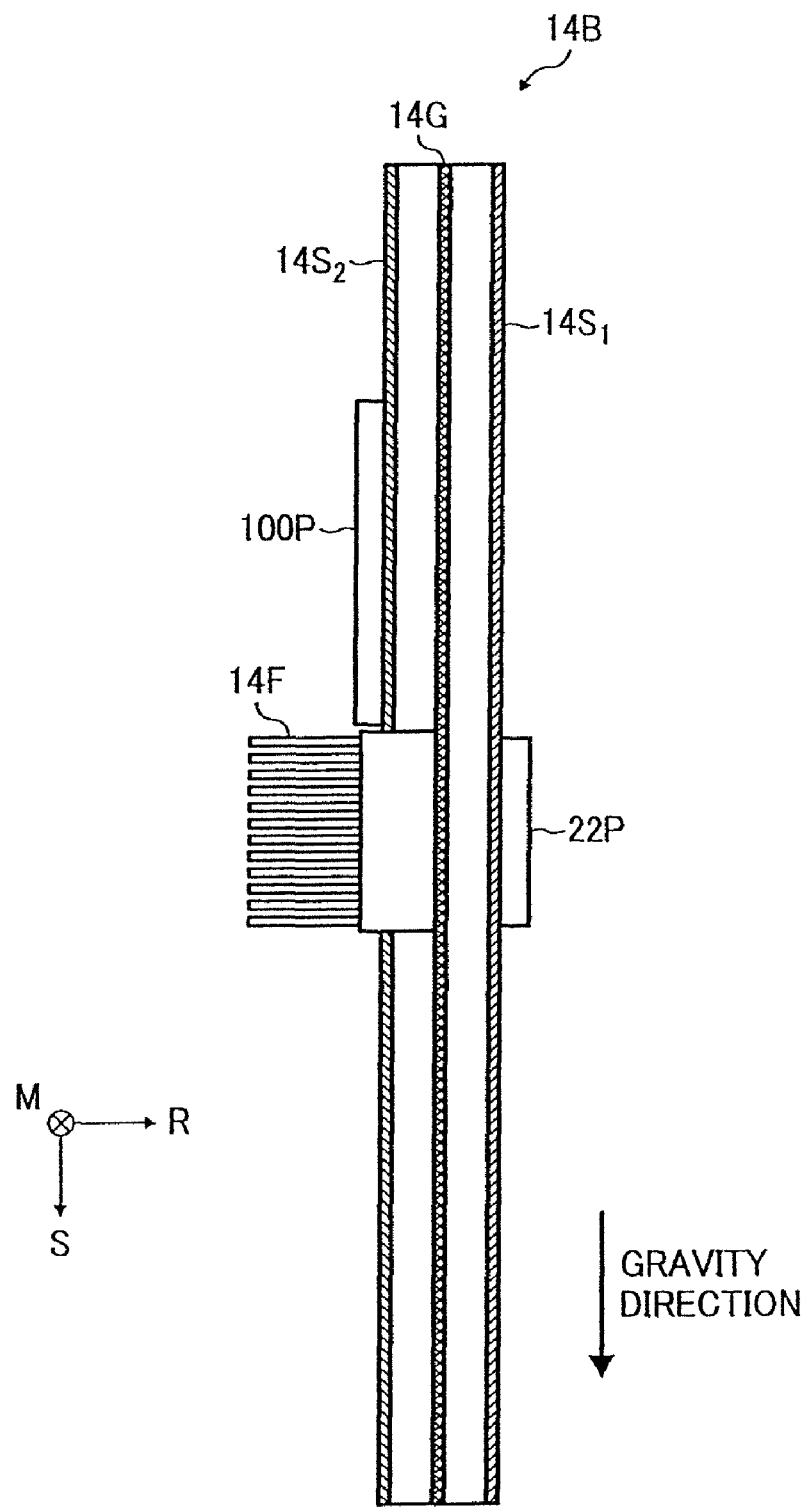
FIG. 16 is a schematic diagram for explaining a heat sink of the light source device.
Figure 17:
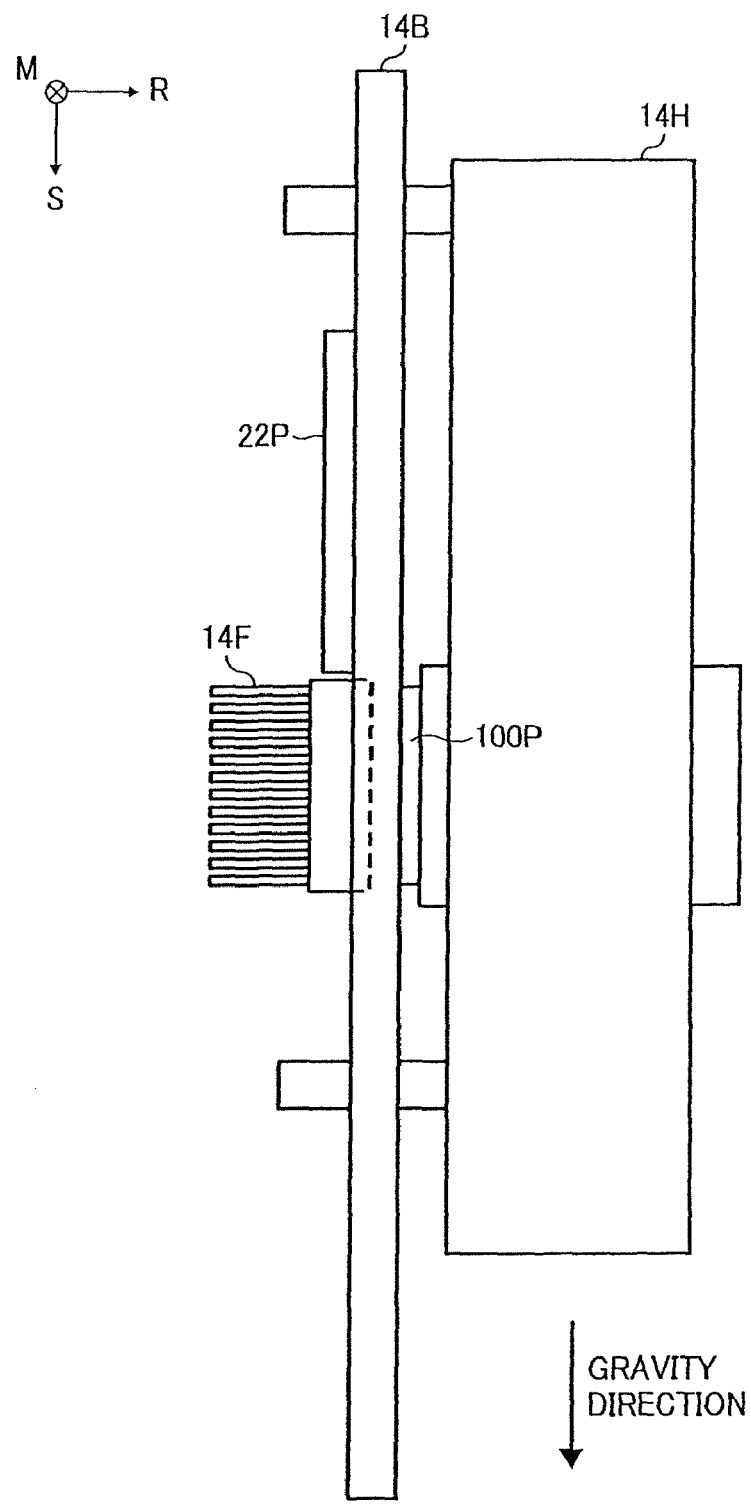
FIG. 17 is a schematic diagram in which the holding unit is attached to the light source device shown in FIG. 16.

Moreover, in the embodiment described above, as shown in FIG. 16 as an example, a heat sink 14F can be added to the light source package 100P. The heat sink 14F is mounted in close contact with the ground layer 14G between the light source package 100P and the drive package 22P. With this, the temperature increase of the two-dimensional array 100 can be further suppressed. In this case, the leaf spring 14D can be omitted (see FIG. 17).

Furthermore, in the embodiment described above, a situation when the light source package 100P and the drive package 22P are mounted on the different surfaces of the control board 14B with each other; however, it is not limited thereto, and the light source package 100P and the drive package 22P can be mounted on the same surface of the control board 14B. Even in this situation, the heat can be suppressed from moving from the drive package 22P to the light source package 100P.

Moreover, in the embodiment described above, if the heat value of the drive package 22P is not so large and the equal length wiring is possible, the center position of the packages can be the same with respect to the M direction.

Furthermore, in the embodiment described above, with respect to the gravity direction, the highest position in the area where the two-dimensional array 100 is mounted can be the same as the lowest position in the area where the drive package 22P is mounted. Even in this situation, the heat generated at the drive package 22P can be suppressed from moving toward the two-dimensional array 100.

Moreover, in the embodiment described above, although a situation when the control board 14B is an unwoven glass fabric base epoxy resin copper clad laminate having three copper foil layers is explained, the present invention is not limited to this situation.

Furthermore, in the embodiment described above, although a situation when the number of the light emitting units of the two-dimensional array 100 is 32 is explained, the present invention is not limited to this situation.

Moreover, in the embodiment described above, a surface emitting laser having one light emitting unit can be used in place of the two-dimensional array 100 described above.

Furthermore, in the embodiment described above, although a situation when all circuits of the drive control unit 22 are stored in the drive package 22P is explained, the present invention is not limited to this situation, and it is sufficient that at least the light source driving circuit 221 is stored in the drive package 22P.

Moreover, in the embodiment described above, although the laser printer 1000 is used as the image forming apparatus, the present invention is not limited to this situation. In short, any image forming apparatus that includes the optical scanning device 1010 can be provided.

For example, even an image forming apparatus that includes the optical scanning device 1010 and irradiates a medium (for example, a paper) which performs color formation by the laser light directly with the laser light can be provided.

Furthermore, even an image forming apparatus that uses a silver salt film as an image carrier can be provided. In this situation, a latent image is formed on the silver salt film by optical scanning, and the latent image can be visualized by the processing similar to the developing process in the normal silver salt photography process. Furthermore, the image can be printed on a photographic paper by the processing similar to the printing process in the normal silver salt photography process. Such an image forming apparatus can be put into practice as an optical plate making apparatus or a photolithography apparatus that draws a computed tomography (CT) scan image or other similar images.

Figure 18:
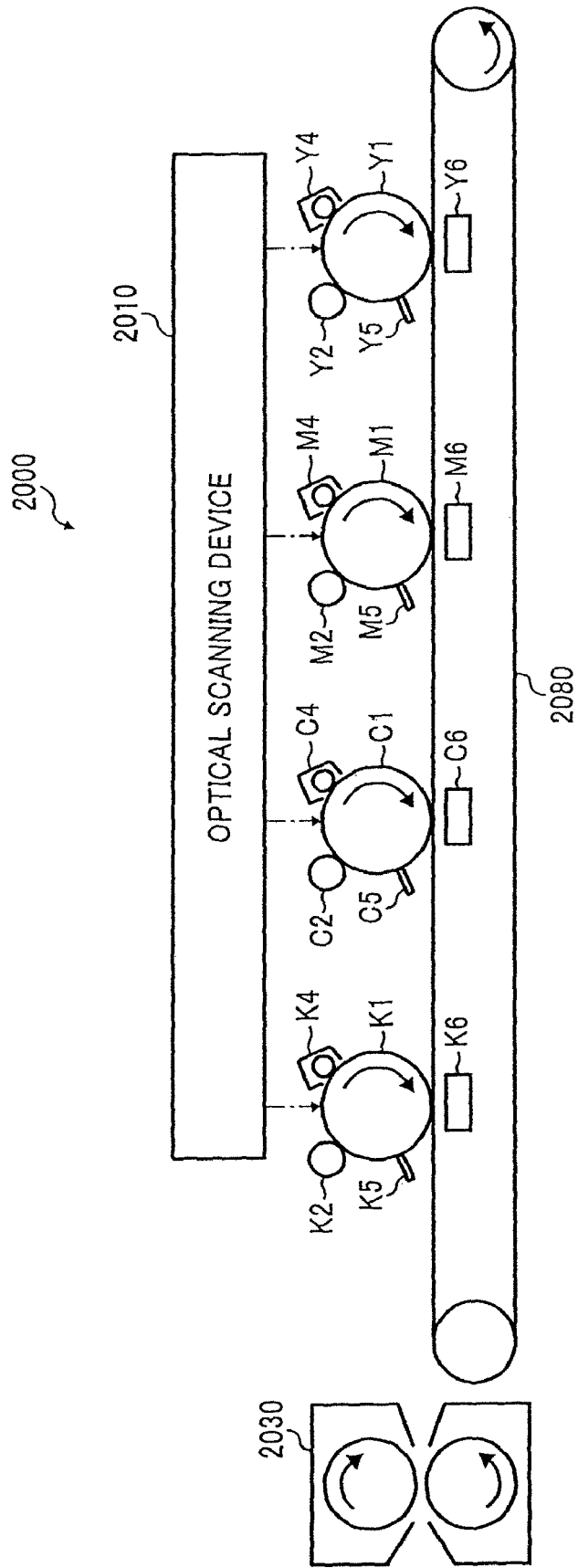
FIG. 18 is a schematic diagram of a color printer.

Moreover, the image forming apparatus can be a color printer 2000 that includes a plurality of photosensitive elements, for example, as shown in FIG. 18.

The color printer 2000 is a tandem type multi-color printer that forms a full-color image by superimposing four color toner images of black, cyan, magenta, and yellow. The color printer 2000 includes a photosensitive element K1, a charging unit K2, a developing unit K4, a cleaning unit K5, and a transferring unit K6 for black, a photosensitive element C1, a charging unit C2, a developing unit C4, a cleaning unit C5, and a transferring unit C6 for cyan, a photosensitive element M1, a charging unit M2, a developing unit M4, a cleaning unit M5, and a transferring unit M6 for magenta, a photosensitive element Y1, a charging unit Y2, a developing unit Y4, a cleaning unit Y5, and a transferring unit Y6 for yellow, an optical scanning device 2010, a transferring belt 2080, and a fixing unit 2030.

Around each photosensitive element that rotates in a direction indicated by an arrow shown in FIG. 18, a charging unit, a developing unit, a transferring unit, and a cleaning unit are arranged. Each charging unit uniformly charges the surface of the corresponding photosensitive element. The optical scanning device 2010 irradiates the uniformly-charged surface of each photosensitive element with light to form a latent image thereon. Then, the developing unit develops the latent image with toner to form a toner image on the surface of the photosensitive element. Each toner image is transferred onto a recording sheet by the transferring unit, and finally the full-color image is fixed on the recording sheet by the fixing unit 2030.

The optical scanning device 2010 includes a light source device similar to the above-mentioned light source device 14, a pre-deflector optical system similar to the above-mentioned pre-deflector optical system, and a scanning optical system similar to the above-mentioned scanning optical system for each color.

A light flux emitted from each light source device is deflected by a common polygon mirror through the corresponding pre-deflector optical system, and irradiated to the corresponding photosensitive element through the corresponding scanning optical system.

Therefore, the optical scanning device 2010 can obtain advantageous effects similar to the optical scanning device 1010. Also, the color printer 2000 can obtain advantageous effects similar to the laser printer 1000.

In addition, in this color printer 2000, the optical scanning device can be provided for each color, or for every two colors.

According to one aspect of the present invention, influence of heat generated in a drive circuit on a light source can be reduced. Therefore, temperature increase of the light source can be suppressed without increasing the size of the device.

According to another aspect of the present invention, a stable light scanning can be performed without increasing the size of the device.

According to still another aspect of the present invention, a high quality image can be formed without increasing the size of the device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light source device comprising:
    a light source that includes a vertical cavity surface emitting laser;
    a drive circuit that drives the light source;
    a circuit board that includes at least one mounting surface on which the light source and the drive circuit are mounted and a ground layer; and
    a heat sink that is mounted in close contact with the ground layer between the light source and the drive circuit, wherein
    the light source is mounted on a first area of the mounting surface,
    the drive circuit is mounted on a second area of the mounting surface,
    a highest end of the first area is at a same height or lower than a lowest end of the second area with respect to a gravity direction defined along the mounting surface, and
    a center position of the first area is different from a center position of the second area with respect to a direction defined along the mounting surface and perpendicular to the gravity direction.

2. The light source device according to claim 1, wherein
    the mounting surface includes a first surface and a second surface,
    the light source is mounted on the first surface, and the drive circuit is mounted on the second surface.

3. The light source device according to claim 1, further comprising a holding unit that holds the circuit board.

4. The light source device according to claim 3, wherein part of the holding unit is in contact with part of the light source.

5. The light source device according to claim 1, wherein the vertical cavity surface emitting laser includes a plurality of light emitting units.

6. An optical scanning device that scans a scanning surface with light, the optical scanning device comprising:
    a light source device including
        a light source that includes a vertical cavity surface emitting laser,
        a drive circuit that drives the light source, and
        a circuit board that includes at least one mounting surface on which the light source and the drive circuit are mounted, wherein
        the light source is mounted on a first area of the mounting surface,
        the drive circuit is mounted on a second area of the mounting surface,
        a highest end of the first area is at a same height or lower than a lowest end of the second area with respect to a gravity direction defined along the mounting surface, and
        a center position of the first area is different from a center position of the second area with respect to a direction defined along the mounting surface and perpendicular to the gravity direction;
    a deflector that deflects light output from the light source device; and
    a scanning optical system that focuses the light deflected by the deflector on the scanning surface.

7. An image forming apparatus comprising:
    at least one image carrier; and
    at least one optical scanning device that scans the image carrier with light that contains image information and includes
    a light source device including
        a light source that includes a vertical cavity surface emitting laser,
        a drive circuit that drives the light source, and
        a circuit board that includes at least one mounting surface on which the light source and the drive circuit are mounted, wherein
        the light source is mounted on a first area of the mounting surface,
        the drive circuit is mounted on a second area of the mounting surface,
        a highest end of the first area is at a same height or lower than a lowest end of the second area with respect to a gravity direction defined along the mounting surface, and
        a center position of the first area is different from a center position of the second area with respect to a direction defined along the mounting surface and perpendicular to the gravity direction;
    a deflector that deflects light output from the light source device; and
    a scanning optical system that focuses the light deflected by the deflector on the image carrier.

8. The image forming apparatus according to claim 7, wherein the image information is multi-color image information.

* * * * *